US009377085B2

(12) United States Patent
Beck et al.

(10) Patent No.: US 9,377,085 B2
(45) Date of Patent: Jun. 28, 2016

(54) MULTI-SPEED GEARBOX (71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 98 days.

(21) Appl. No.: 14/396,085

(22) PCT Filed: Mar. 13, 2013

(86) PCT No.: PCT/EP2013/055057
§ 371 (c)(1),
(2) Date: Oct. 22, 2014

(87) PCT Pub. No.: WO2013/159988
PCT Pub. Date: Oct. 31, 2013

(65) Prior Publication Data
US 2015/0119188 A1    Apr. 30, 2015

(30) Foreign Application Priority Data
Apr. 27, 2012    (DE) .......................... 10 2012 207 085

(51) Int. Cl.
*F16H 3/66*    (2006.01)
(52) U.S. Cl.
CPC .......... *F16H 3/66* (2013.01); *F16H 2200/0065* (2013.01); *F16H 2200/0069* (2013.01);
(Continued)

(58) Field of Classification Search
CPC ............ F16H 3/66; F16H 2200/00695; F16H 2200/0069; F16H 2200/0082; F16H 2200/0086; F16H 2200/2012; F16H 2200/2041; F16H 2200/2046; F16H 2200/2094
USPC .......................................... 475/276
See application file for complete search history.

(56) References Cited

U.S. PATENT DOCUMENTS 6,960,149 B2    11/2005    Ziemer
7,695,398 B2    4/2010    Phillips et al.
(Continued)

FOREIGN PATENT DOCUMENTS

DE         101 15 995 A1    10/2002
DE    10 2008 031 970 A1    1/2009
(Continued)

OTHER PUBLICATIONS

German Search Report Corresponding to 10 2012 207 031.1 mailed Dec. 19, 2012.
(Continued)

*Primary Examiner* — Jacob S Scott
(74) *Attorney, Agent, or Firm* — Davis & Bujold PLLC; Michael J. Bujold (57) ABSTRACT

A four-stage multi-stage transmission in which the carrier (12) of the first planetary gear set (1) is connected with a sun gear (41) of the fourth planetary set, a ring gear (43) of the fourth planetary gear set (4) is connected with the output shaft (71), a ring gear (13) of the first planetary gear set (1) and a carrier (22) of the second planetary gear set (2) can be coupled with the housing (72), via a first brake (51). A sun gear (11) of the first planetary gear set (1) can be coupled with the housing (72), via a second brake (52), and the ring gear (43) can be coupled with the sun gear (41), respectively, of the fourth planetary gear set (4) via a first clutch (61).

18 Claims, 4 Drawing Sheets

(52) U.S. Cl.
CPC . *F16H2200/0082* (2013.01); *F16H 2200/0086* (2013.01); *F16H 2200/2012* (2013.01); *F16H 2200/2041* (2013.01); *F16H 2200/2046* (2013.01); *F16H 2200/2094* (2013.01)

(56) References Cited

U.S. PATENT DOCUMENTS

| | | | |
|---|---|---|---|
| 8,210,981 B2 | 7/2012 | Bauknecht et al. | |
| 8,398,522 B2 | 3/2013 | Bauknecht et al. | |
| 2004/0048716 A1* | 3/2004 | Ziemer | F16H 3/66 475/286 |
| 2009/0197734 A1 | 8/2009 | Phillips et al. | |

FOREIGN PATENT DOCUMENTS

| | | |
|---|---|---|
| DE | 10 2008 038 210 A1 | 3/2009 |
| DE | 10 2008 000 428 A1 | 9/2009 |
| DE | 10 2008 000 429 A1 | 9/2009 |
| DE | 10 2008 041 196 A1 | 2/2010 |
| DE | 10 2008 041 200 A1 | 2/2010 |
| DE | 10 2008 041 209 A1 | 2/2010 |
| DE | 10 2009 020 442 A1 | 11/2010 |
| DE | 10 2009 028 670 A1 | 2/2011 |
| DE | 10 2009 047 279 A1 | 6/2011 |
| JP | 2005-083479 A | 3/2005 |
| JP | 2006-349153 A | 12/2006 |

OTHER PUBLICATIONS

German Search Report Corresponding to 10 2012 207 043.5 mailed Nov. 13, 2012.
German Search Report Corresponding to 10 2012 207 081.8 mailed Dec. 19, 2012.
German Search Report Corresponding to 10 2012 207 085.0 mailed Dec. 19, 2012.
German Search Report Corresponding to 10 2012 207 091.5 mailed Dec. 19, 2012.
German Search Report Corresponding to 10 2012 207 092.3 mailed Dec. 19, 2012.
International Search Report Corresponding to PCT/EP2013/055061 mailed May 21, 2013.
International Search Report Corresponding to PCT/EP2013/055060 mailed May 21, 2013.
International Search Report Corresponding to PCT/EP2013/055058 mailed May 21, 2013.
International Search Report Corresponding to PCT/EP2013/055057 mailed May 21, 2013.
International Search Report Corresponding to PCT/EP2013/055062 mailed May 21, 2013.
International Search Report Corresponding to PCT/EP2013/055059 mailed May 21, 2013.
Written Opinion Corresponding to PCT/EP2013/055057 mailed May 21, 2013.

* cited by examiner

| GEAR | ENGAGED SHIFT ELEMENT | | | | | | GEAR RATIO | GEAR INTERVAL |
|---|---|---|---|---|---|---|---|---|
| | BRAKE | | CLUTCH | | | | | |
| | 51 | 52 | 62 | 64 | 63 | 61 | i | φ |
| 1 | × | | | | × | × | 4.900 | 1.625 |
| 2 | × | × | | | × | | 3.016 | 1.586 |
| 3 | × | | × | | × | | 1.902 | 1.436 |
| 4 | | × | × | | × | | 1.324 | 1.324 |
| 5 | | | × | × | × | | 1.000 | 1.207 |
| 6 | | × | | × | × | | 0.828 | 1.179 |
| 7 | | × | × | × | | | 0.703 | 1.142 |
| 8 | × | × | | × | | | 0.615 | 1.120 |
| 9 | × | | | × | × | | 0.550 | TOTAL |
| R | × | | × | | | × | −3.218 | 8.913 |
| Z | | × | × | | | × | 3.091 | |
| Z | | × | | | × | × | −0.934 | |
| M | × | | | × | | × | 1.000 | |

Fig. 11

MULTI-SPEED GEARBOX

This application is a National Stage completion of PCT/EP2013/055057 filed Mar. 13, 2013, which claims priority from German patent application serial no. 10 2012 207 085.0 filed Apr. 27, 2012.

FIELD OF THE INVENTION

The invention relates to a multi-stage transmission in planetary design, in particular for a motor vehicle.

BACKGROUND OF THE INVENTION

Such multi-stage transmissions are mainly used as automatic transmissions of motor vehicles in which the effective power flow in the respective gear step is defined by a targeted activation of the shift element within the planetary set. In addition, the planetary sets in an automatic transmission are usually connected with a start-up element subject to a slip effect and alternatively provided with a bypass clutch, as for example a hydrodynamic torque converter or a hydraulic clutch.

A multi-stage transmission in planetary design is known from DE 10 2008 000 428 A1 in which four planetary sets as well as a total of eight rotatable shafts are disposed in a housing, of which one constitutes the input drive shaft and the other the drive shaft of the multi-stage transmission. Furthermore, at least six shift elements are provided in the area of the shafts, by the targeted activation of which the power flow within the four planetary sets varies and thus different transmission ratios are definable between the input drive shaft and the drive shaft. Hereby it is possible to shift into a total of nine forward gears as well as one reverse gear.

SUMMARY OF THE INVENTION

The object of the invention is to disclose an alternative multi-stage transmission, preferably with an improved degree of effectiveness, and a sufficiently greater and sufficiently distributed transmission ratio range.

The object of the invention is achieved by a multi-stage transmission. In particular, by a multi-stage transmission, comprising at least four planetary sets, a housing, an input drive shaft and a drive shaft, in which a carrier of the first planetary gear set is connected with a sun gear of the fourth planetary set,
a ring gear of the fourth planetary gear set is connected with the drive shaft,
a ring gear of the first planetary gear set and a carrier of the second planetary gear set can be coupled with the housing by a first brake,
a sun gear of the first planetary gear set can be coupled with the housing via a second brake,
the ring gear can be coupled with the sun gear, or the ring gear with the carrier or the sun gear with the carrier, respectively, of the fourth planetary gear set via a first clutch,
three of the following five connections are implemented to be permanent and two of these five connections to be releasable by at least one shift element:
connection of the input drive shaft with a sun gear of the second planetary gear set,
connection of the input drive shaft with a sun gear of the third planetary gear set,
connection of the ring gear of the third planetary gear set with the carrier of the second planetary gear set,
connection of the carrier of the third planetary gear set with a carrier of the fourth planetary gear set,
connection of the ring gear of the second planetary gear set with the carrier of the first planetary gear set and
the input drive shaft is connected with a clutch part of a clutch, and the other clutch part is connected permanently with
the carrier of the third planetary gear set and the carrier of the fourth planetary gear set or
the carrier of the fourth planetary gear set or
the ring gear of the third planetary gear set.

In particular, a gear set is understood to be a planetary gear set; it comprises at least one sun gear in which one or more planetary gears mesh, a carrier which determines the axes of the planetary gears and a ring gear in which the planetary gears mesh. Preferably, the ring gear has an inner gearing and the sun gear an outer gearing.

One advantage of the invention can be that the shift elements of the multi-stage transmission, that is, the transmission-side brakes and clutches, are easily accessible from the outside. Thus, the actuators, for example electric motors, hydraulic valves, hydraulic pumps and the like, can be disposed in the vicinity of the shift elements, whereby mechanical and/or hydraulic losses can be diminished and less energy can be necessary for the activation of shift elements. Also less energy is needed to maintain the shift element in its current operating state, that is, disengaged or engaged, respectively, for example the losses in pressure are less as well due to short lines. It is also possible to place the shift elements on the housing, so they are at least partially rotationally fixed, by which seals that connect a stationary line with a rotating line can be completely or partially avoided.

The spatial configuration of easily accessible shift elements simplifies the usual replacement of hydraulically activated lamellar clutches or brakes by electromechanically or electrohydraulically activated brakes and clutches, that are comparatively easy to control as needed. Easily accessible shift elements are, on the one hand, brakes that couple a shaft rotationally fixed with the housing, but on the other hand, shift elements on the outer lying shafts of the multi-stage transmission, preferably input or output shaft to which the hydraulic fluid required for activation can be supplied comparatively easily.

Besides this property, the multi-stage transmission also has a good degree of gearing effect, only little stress on component parts, especially low planetary set and shift element torque, low absolute and relative speeds of rotation and/or a small construction cost. The latter makes possible the implementation of the multi-stage transmission with just little weight and low costs. Finally, the multi-stage transmission enables a good transmission ratio range, thus a very serviceable stepping of the gears.

In general, a preferred embodiment of the multi-stage transmission comprises four planetary gear sets, four clutches, two brakes and no fixed coupling of the housing.

Through actuation of two shift elements, respectively (brakes and/or clutches) nine forward gears and one reverse gear can be engaged, wherein another alternative shift position is available for the fifth gear. Furthermore, the transmission makes possible shifting of an additional forward gear and an additional reverse gear.

A hydrodynamic torque converter, a hydrodynamic clutch, an additional start-up clutch, an integrated start-up clutch or brake, and/or an additional electric machine can serve as start-up elements.

In principle, an electric machine or other power/energy source can be disposed on each shaft. Furthermore, on each shaft a freewheel can be disposed basically on the housing or to another shaft.

Preferably the multi-stage transmission is implemented as a standard drive, but a front-traverse design is also conceivable.

All shift elements can act in a friction or form locking manner. Preferably the first clutch and/or the third clutch, however, are implemented out as form-locking clutches, especially as claw clutches, which leads to a significantly improved efficiency and therefore higher fuel economy.

As a result it is understood that the first and third clutch need to be activated only once with a shift from the first into the ninth gear and that therefore these shift elements are especially suited to be executed as a claw clutch. It is thus also understood that with these shift elements the advantage of the better degree of effect prevails over the disadvantage of the more difficult handling because of their comparatively seldom actuation. In addition it is understood that the actuation of the third clutch can take place in comparatively high gears, whereby the difference of rotational speed of the shafts can be small and thus favorable for the one actuation of the claw clutch.

The geometric position (sequence) of the individual gear set and shift elements is freely selectable, as long as it allows the elements to be combined. The individual elements can thus be shifted in their position at will.

Further advantageous variants of the multi-stage transmission result from the dependent claims as well as from the description in overview with the drawings. Functionally, these have the same properties as the main system, in particular similar degree of effect, similar stepping etc.

BRIEF DESCRIPTION OF THE DRAWINGS

For a better understanding of the invention this will be more precisely explained by means of the following drawings.

They are, in greatly simplified diagrammatic representation.

DETAILED DESCRIPTION OF THE PREFERRED EMBODIMENTS

By way of introduction it should be noted that the same parts are provided with the same reference numbers or same part designations in the differently described embodiments so that the disclosures contained in the whole description can be correspondingly applied to the parts with the same reference numbers or same part designations. The chosen specifications of position, for example such as above, below, on the side etc., also refer to the immediately described as well as represented drawing and with a change of position are to be applied correspondingly to the new position. Furthermore, single features or combinations of features from the different embodiments illustrated and described may also represent, by themselves, independent, inventive or invention-related solutions.

Figure 1:
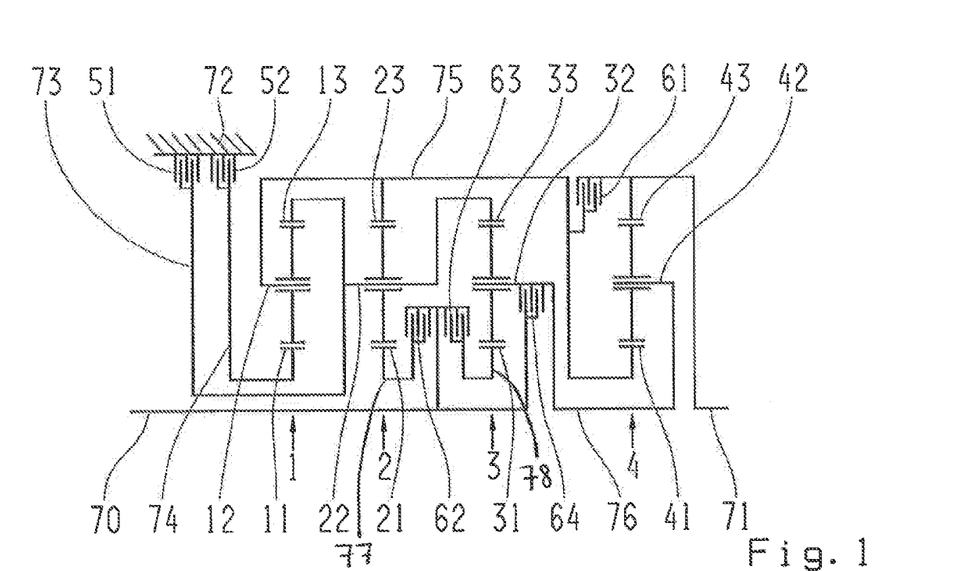
FIG. 1 a first diagrammatic representative model variant of a multi-stage transmission according to the invention.

FIG. 1 shows a multi-stage transmission comprising four planetary gear sets 1, 2, 3, 4, an input drive shaft 70, an output shaft 71, six other rotatable shafts 73, 74, 75, 76, 77, 78, six shift elements 51, 52, 61, 62, 63, 64, of which two are brakes 51, 52 and four are clutches 61, 62, 63, 64. The four planetary gear sets 1, 2, 3, 4 are disposed behind one another in the sequence: first planetary gear set 1, second planetary gear set 2, third planetary gear set 3, fourth planetary gear set 4. The first planetary gear set 1, the second planetary gear set 2, the third planetary gear set 3 and the fourth planetary gear set 4 are constructed as minus planetary gear sets. The planetary gear sets 1, 2, 3, 4 are jointly surrounded by a housing 72. In the variant of the multi-stage transmission of FIG. 1:

a carrier 12 of the first planetary gear set 1 is connected with a sun gear 41 of the fourth planetary gear set 4, a ring gear 43 of the fourth planetary gear set 4 is connected with the output shaft 71, a ring gear 13 of the first planetary gear set 1 and a carrier 22 of the second planetary gear set 2 can be coupled with the housing 72 via a first brake 51, and sun gear 11 of the first planetary gear set 1 can be coupled with the housing 72 by a second brake 52, the ring gear 43 can be coupled with the sun gear 41, respectively, of the fourth planetary gear set 4 via a first clutch 61, the ring gear 23 of the second planetary gear set 2 is permanently connected with the carrier 12 of the first planetary gear set 1, the input drive shaft 70 can be coupled with the sun gear 21 of the second planetary gear set 2 via a second clutch 62, the ring gear 33 of the third planetary gear set 3 is permanently connected with the carrier 22 of the second planetary gear set 2, the input drive shaft 70 can be coupled with the sun gear 31 of the third planetary gear set 3 via a third clutch 63, the carrier 32 of the third planetary gear set 3 is permanently connected with the carrier 42 of the fourth planetary gear set 4 and the input drive shaft 70 can be coupled with the carrier 32 of the third planetary gear set 3, respectively with the carrier 42 of the fourth planetary gear set 4, via a fourth clutch 64.

Figure 2:
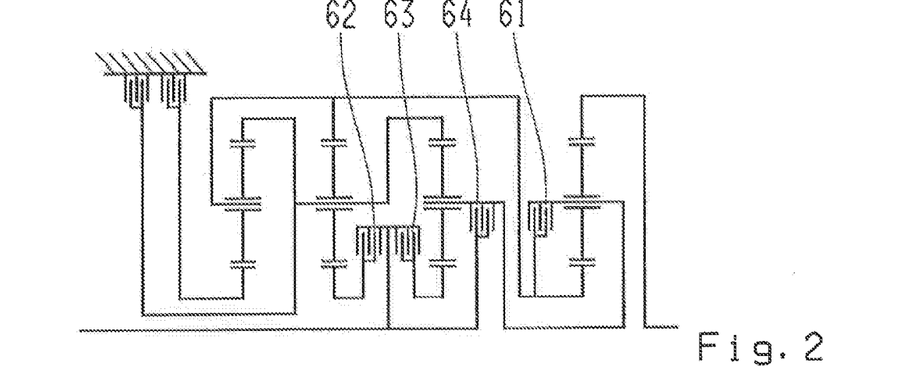
FIG. 2 a second diagrammatic representative model variant of a multi-stage transmission according to the invention.

FIG. 2 shows a multi-stage transmission that is very similar to the multi-stage transmission of FIG. 1 and differs from the embodiment of FIG. 1 in the following points:

the sun gear 41 of the fourth planetary gear set 4 cannot be coupled with the ring gear 43 of the fourth planetary gear set 4 but with the carrier 42 of the fourth planetary gear set 4 via a first clutch 61.

Figure 3:
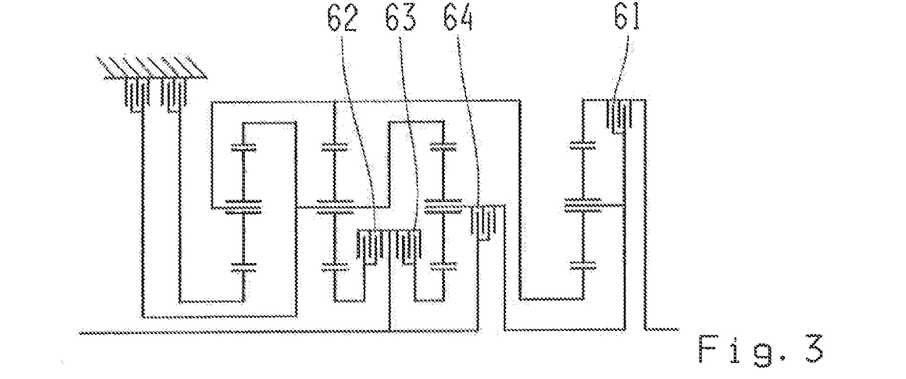
FIG. 3 a third diagrammatic representative model variant of a multi-stage transmission according to the invention.

FIG. 3 shows a multi-stage transmission that is very similar to the multi-stage transmission of FIG. 1 and differs from the embodiment of FIG. 1 in the following points:

the ring gear 43 of the fourth planetary gear set 4 cannot be coupled with the sun gear 41 of the fourth planetary gear set 4 but with the carrier 42 of the fourth planetary gear set 4 via a first clutch 61.

At this point it will be noted that the variants represented in FIG. 2 and FIG. 3 are also applicable to the following variants in regard to the position of the first clutch 61. That is, the first clutch 61 is not necessarily disposed between the ring gear 43 and the sun gear 41, but can also be arranged between the sun gear 41 and the carrier 42 or between the ring gear 43 and the carrier 42.

Figure 4:
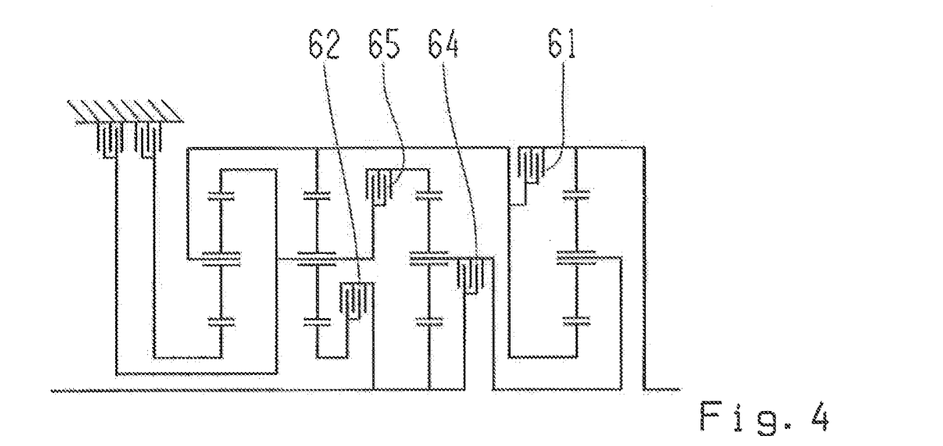
FIG. 4 a fourth diagrammatic representative model variant of a multi-stage transmission according to the invention.

FIG. 4 shows a multi-stage transmission that is very similar to the multi-stage transmission of FIG. 1 and differs from the embodiment of FIG. 1 in the following points:

the ring gear 33 of the third planetary gear set 3 can be coupled with the carrier 22 of the second planetary gear set 2 via a fifth clutch 65 and the input drive shaft 70 is permanently connected with the sun gear 31 of the third planetary gear set 3.

Figure 5:
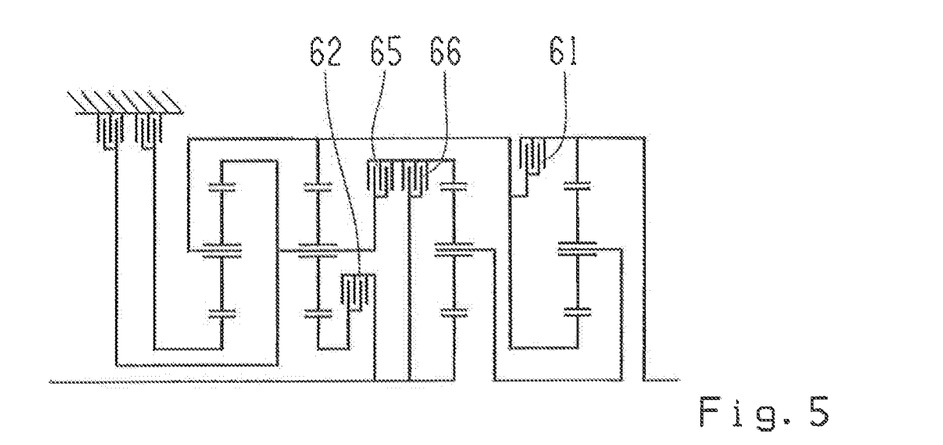
FIG. 5 a fifth diagrammatic representative model variant of a multi-stage transmission according to the invention.

FIG. 5 shows a multi-stage transmission that is very similar to the multi-stage transmission of FIG. 4 and differs from the embodiment of FIG. 4 in the following points:

the input drive shaft 70 cannot be coupled with the carrier 32 of the third planetary gear set (3) by the fourth clutch 64, but can be coupled with the ring gear 33 of the third planetary gear set 3 via a sixth clutch 66.

Figure 6:
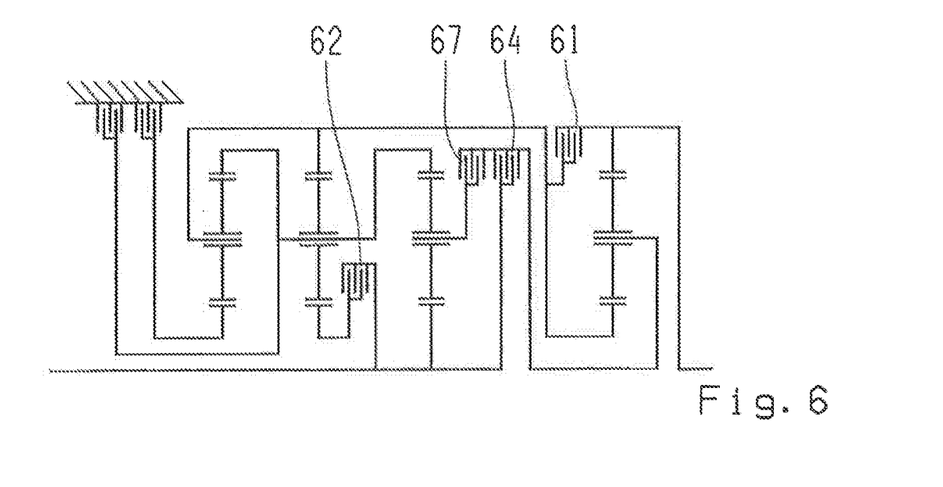
FIG. 6 a sixth diagrammatic representative model variant of a multi-stage transmission according to the invention.

FIG. 6 shows a multi-stage transmission that is very similar to the multi-stage transmission of FIG. 1 and differs from the embodiment of FIG. 1 in the following points:

the input drive shaft 70 is permanently connected with the sun gear 31 of the third planetary gear set 3, the input drive shaft 70 can be coupled with the carrier 42 of the fourth planetary gear set 4 via a fourth clutch 64 and the carrier 32 of the third planetary gear set 3 can be coupled with the carrier 42 of the fourth planetary gear set 4 via a seventh clutch 67.

Figure 7:
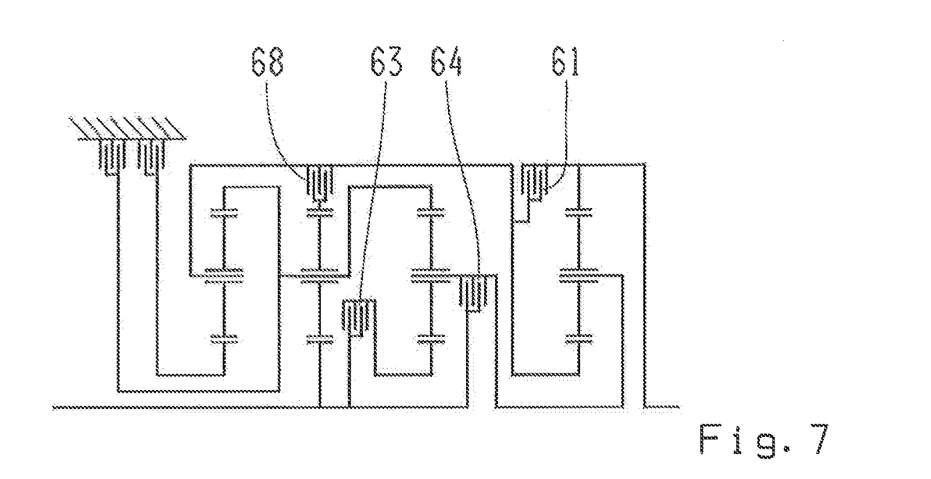
FIG. 7 a seventh diagrammatic representative model variant of a multi-stage transmission according to the invention.

FIG. 7 shows another variant of a multi-stage transmission comprising four planetary gear sets 1, 2, 3, 4, an input drive shaft 70, an output shaft 71, six other rotatable shafts 73, 74, 75, 76, 77, 78, six shift elements 51, 52, 61, 63, 64, 68 of which two are brakes 51, 52 and four are clutches 61, 63, 64, 68. The four planetary gear sets 1, 2, 3, 4 are disposed behind one another in the sequence: first planetary gear set 1, second planetary gear set 2, third planetary gear set 3, fourth planetary gear set 4. The first planetary gear set 1, the second planetary gear set 2, the third planetary gear set 3 and the fourth planetary gear set 4 are constructed as minus planetary gear sets. The planetary gear sets 1, 2, 3, 4 are jointly surrounded by a housing 72. In the variant of the multi-stage transmission of FIG. 7:

a carrier 12 of the first planetary gear set 1 is connected with a sun gear 41 of the fourth planetary gear set 4, a ring gear 43 of the fourth planetary gear set 4 is connected with the output shaft 71, a ring gear 13 of the first planetary gear set 1 and a carrier 22 of the second planetary gear set 2 can be coupled with the housing 72 via a second brake 52, a sun gear 11 of the first planetary gear set 1 can be coupled with the housing 72 by a second brake 52, the ring gear 43 can be coupled with the sun gear 41, respectively, of the fourth planetary gear set 4, via a first clutch 61, the ring gear 23 of the second planetary gear set 2 can be coupled with the carrier 12 of the first planetary gear set 1 via an eighth clutch 68, the input drive shaft 70 is permanently connected with the sun gear 21 of the second planetary gear set 2, the ring gear 33 of the third planetary gear set 3 is permanently connected with the carrier 22 of the second planetary gear set 2, the input drive shaft 70 can be coupled with the sun gear 31 of the third planetary gear set 3 via a third clutch 63, the carrier 32 of the third planetary gear set 3 is permanently connected with the carrier 42 of the fourth planetary gear set 4 and the input drive shaft 70 can be coupled with the carrier 32 of the third planetary gear set 3, respectively with the carrier 42 of the fourth planetary gear set 4, via a fourth clutch 64.

Figure 8:
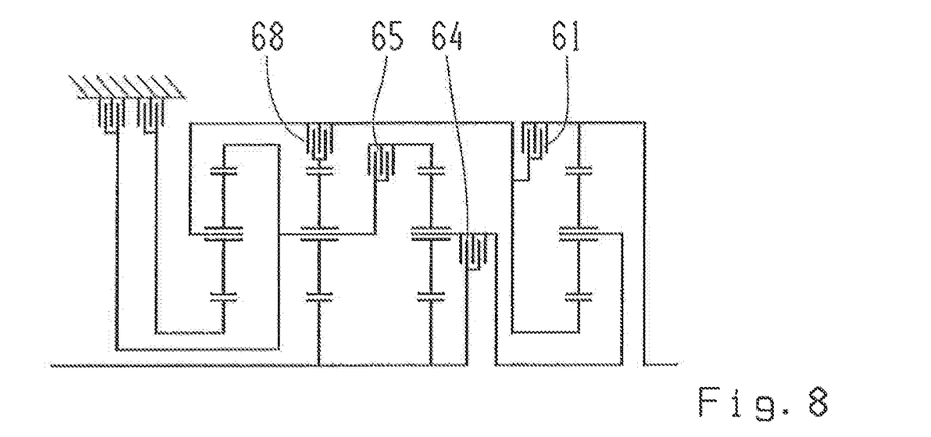
FIG. 8 an eighth diagrammatic representative model variant of a multi-stage transmission according to the invention and FIG. 9 a ninth diagrammatic representative model variant of a multi-stage transmission according to the invention.

FIG. 8 shows a multi-stage transmission that is very similar to the multi-stage transmission of FIG. 7 and differs from the embodiment of FIG. 7 in the following points:

a ring gear 33 of the third planetary gear set 3 can be coupled with the carrier 22 of the second planetary gear set 2 via a fifth clutch 65, the input drive shaft 70 is permanently connected with the sun gear 31 of the third planetary gear set 3.

Figure 9:
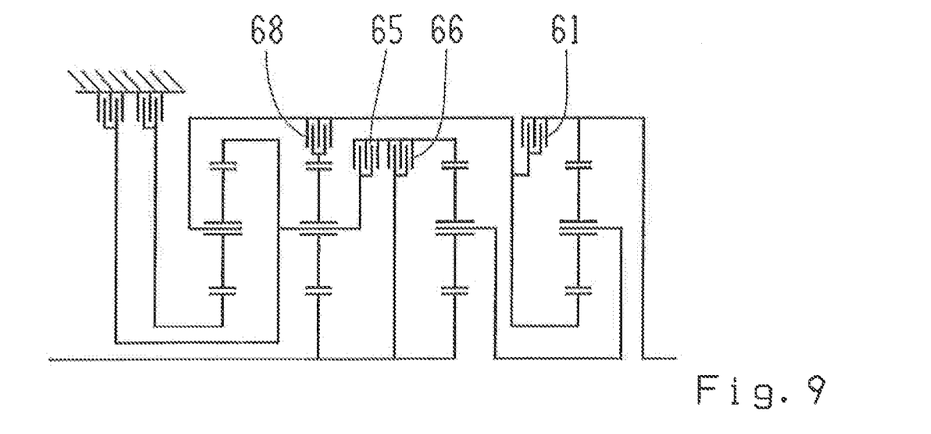

FIG. 9 shows a multi-stage transmission that is very similar to the multi-stage transmission of FIG. 8 and differs from the embodiment of FIG. 8 in the following points:

the input drive shaft 70 can be coupled with the ring gear 33 of the third planetary gear set 3 via a sixth clutch 66.

Figure 10:
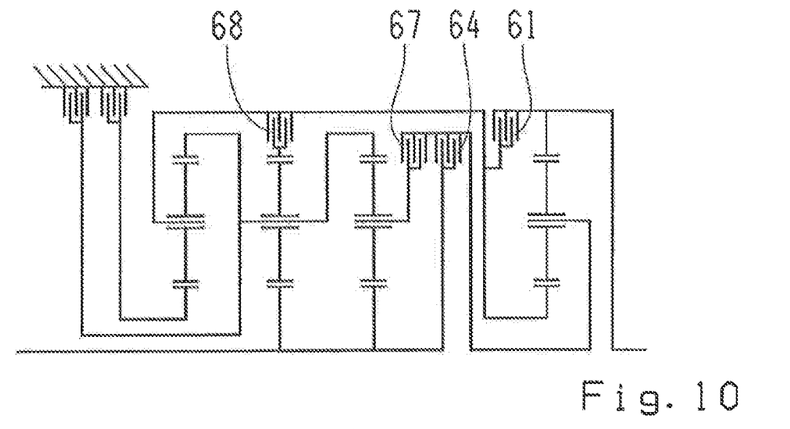
FIG. 10 a tenth diagrammatic representative model variant of a multi-stage transmission according to the invention.

FIG. 10 shows a multi-stage transmission that is very similar to the multi-stage transmission of FIG. 7 and differs from the embodiment of FIG. 7 in the following points:

the input drive shaft 70 is permanently connected with the sun gear 31 of the third planetary gear set 3, the carrier 32 of the third planetary gear set 3 can be coupled with the carrier 42 of the fourth planetary gear set 4 via a seventh clutch 67 and the input drive shaft 70 is permanently connected with the sun gear 31 of the third planetary gear set 3.

In all the multi-stage transmissions represented in FIGS. 1, 2, and 3 the following gears can be engaged:

A first gear can be implemented with the engaged first brake 51, the engaged first clutch 61 and the engaged third clutch 63.

A second gear can be implemented with the engaged first brake 51, the engaged second brake 52 and the engaged third clutch 63.

A third gear can be implemented with the engaged first brake 51, the engaged second clutch 62 and the engaged third clutch 63.

A fourth gear can be implemented with the engaged second brake 52, the engaged second clutch 62 and the engaged third clutch 63.

A fifth gear can be implemented with the engaged second clutch 62, the engaged third clutch 63 and the engaged fourth clutch 64 or with the engaged first brake 51, the engaged first clutch 61 and the engaged fourth clutch 64.

A sixth gear can be implemented with the engaged second brake 52, the engaged third clutch 63 and the engaged fourth clutch 64.

A seventh gear can be implemented with the engaged second brake 52, the engaged second clutch 62 and the engaged fourth clutch 64.

An eighth gear can be implemented with the engaged first brake 51, the engaged second brake 52 and the engaged fourth brake 64.

A ninth gear can be implemented with the engaged first brake 51, the engaged second clutch 62 and the engaged fourth clutch 64.

A reverse gear can be implemented with the engaged first brake 51, the engaged first clutch 61 and the engaged second clutch 62.

An additional forward gear can be implemented with the engaged second brake 52, the engaged first clutch 61 and the second clutch 62.

An additional forward gear can be implemented with the engaged second brake 52, the engaged first clutch 61 and the engaged third clutch 63.

At the same time the respective shift elements not mentioned are disengaged.

Figure 11:
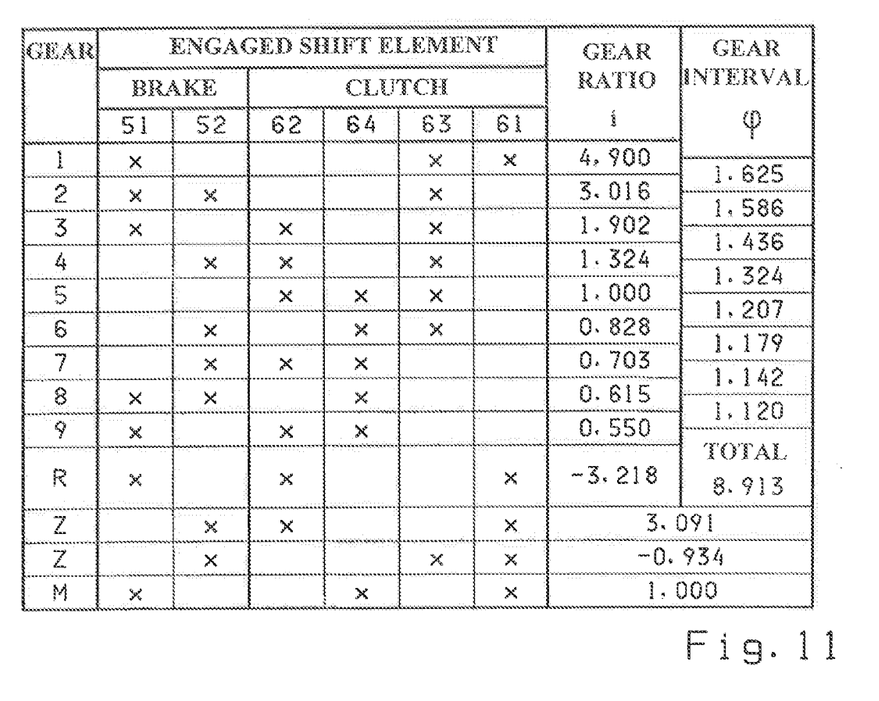
FIG. 11 a table that shows the closed shift elements for the transmission variants illustrated in FIGS. 1 to 3 in each gear step.

The table in FIG. 11 also shows this as it shows the transmission ratios of the respective gear steps as well.

The shift positions of the multi-stage transmission shown in FIG. 7 are completely similar to those of the multi-stage transmission shown in FIG. 1 to 3 but there the eighth clutch 68 takes the place of the second clutch 62.

The shift positions of the multi-stage transmission shown in FIG. 4 are completely similar to those of the multi-stage transmission shown in FIGS. 1 to 3 but there the fifth clutch 65 takes the place of the third clutch 63.

The shift positions of the multi-stage transmission shown in FIG. 8 are completely similar to those of the multi-stage transmission shown in FIG. 4 but there the eighth clutch 68 takes the place of the second clutch 62.

The shift positions of the multi-stage transmission shown in FIG. 5 are completely similar to those of the multi-stage transmission shown in FIG. 4 but there the sixth clutch 66 takes the place of the fourth clutch 64.

The shift positions of the multi-stage transmission shown in FIG. 9 are completely similar to those of the multi-stage transmission shown in FIG. 5 but there the eighth clutch 68 takes the place of the second clutch 62.

The shift positions of the multi-stage transmission shown in FIG. 6 are completely similar to those of the multi-stage transmission shown in FIG. 4 but there the seventh clutch 67 takes the place of the fifth clutch 65.

The shift positions of the multi-stage transmission shown in FIG. 10 are completely similar to those of the multi-stage transmission shown in FIG. 6 but there the eighth clutch 68 takes the place of the second clutch 62.

Preferably, all the gear sets 1, 2, 3, 4 in the multi-stage transmission are implemented as minus gear sets.

In an advantageous variant the transmission ratios are:
- −2.017 between sun gear 11 and ring gear 13 of the first gear set 1, and/or
- −3.218 between sun gear 21 and ring gear 23 of the second gear set 2, and/or
- −3,900 between sun gear 31 and ring gear 33 of the third gear set 3, and/or
- −1.600 between sun gear 41 and ring gear 43 of the fourth gear set 4.

In general, instead of an implementation of a first specified connection/coupling to a carrier 12, 22, 32, 42 of a gear set 1, 2, 3, 4 and a second specified connection/coupling to a ring gear 13, 23, 33, 43 of this gear set 1, 2, 3, 4, the first specified connection/coupling may be implemented to specified ring gear 13, 23, 33, 43 of this gear set 1, 2, 3, 4 and the second specified connection/coupling to specified carrier 12, 22, 32, 42 of this gear set 1, 2, 3, 4, wherein this gear set 1, 2, 3, 4 is implemented as a plus gear set instead of a minus gear set or as a minus gear set instead of a plus gear set, respectively. In other words the connection/coupling to the carrier 12, 22, 32, 42 and to the ring gear 13, 23, 33, 43 of a gear set 1, 2, 3, 4 is exchanged and the direction of rotation between sun gear 11, 21, 31, 41 and ring gear 13, 23, 33, 43 of gear set 1, 2, 3, 4 is reversed. It should also be noted in the configuration of the multi-stage transmission, the amount of stationary transmission ratio is increased or decreased by 1, when the shiftable transmission ratios between input drive 70 and output shaft 71 should otherwise remain equal. By specified variations of the gear sets 1, 2, 3, 4 the connection/coupling between the individual transmission elements can thus be changed without changing the characteristics of the transmission at the same time. Thereby several structural configurations are available, which can simplify the implementation of the transmission in individual cases. The above-mentioned exchange of the connection/coupling is not limited to one gear set 1, 2, 3, 4, but can be applied to several gear sets 1, 2, 3, 4 at the same time as well.

The embodiments show possible variations in the implementation of a multi-stage transmission of the invention, where it should be noted here the invention is not limited to the variations in implementation of it specifically shown, but rather diverse combinations of the individual variations in implementation are possible among themselves and this possibility of variation lies within the ability of the person skilled in the art on the basis of the teaching of technical actions by means of the present invention. In particular, the possibilities of the scope of protection that also result from the combinatorics and Claim 1, although not explicitly shown in the drawings, are included. Moreover, the total conceivable variations in implementation that are possible through combinations of single details of the represented and described embodiment variations are included in the scope of protection.

For the sake of order it is noted that, for better understanding of the design of the multi-stage transmission, this is shown diagrammatically in the drawings and in reality can comprise more parts than shown, less parts than shown or even other parts. In general, the concrete structural configuration lies within the scope of the abilities of a person skilled in the art.

The problem underlying the independent inventive solutions can be inferred from the description.

REFERENCE NUMERALS

1 first transmission gear set
2 second transmission gear set
3 third transmission gear set
4 fourth transmission gear set
11 sun gear of the first transmission gear set
12 carrier of the first transmission gear set
13 ring gear of the first transmission gear set
21 sun gear of the second transmission gear set
22 carrier of the second transmission gear set
23 ring gear of the second transmission gear set
31 sun gear of the third transmission gear set
32 carrier of the third transmission gear set
33 ring gear of the third transmission gear set
41 sun gear of the fourth transmission gear set
42 carrier of the fourth transmission gear set
43 ring gear of the fourth transmission gear set
51 first brake
52 second brake
61 first clutch
62 second clutch
63 third clutch 64 fourth clutch
65 fifth clutch
66 sixth clutch
67 seventh clutch
68 eighth clutch
70 input drive shaft
71 output shaft
72 housing
73 . . . 76 shaft

The invention claimed is:

1. A multi-stage transmission comprising:
at least first, second, third and fourth planetary gear sets (1,2,3,4), each of the first, the second, the third and the fourth planetary gear sets comprises a carrier, a sun gear and a ring gear,
a housing (72),
an input drive shaft (70),
an output shaft (71),
wherein the carrier (12) of the first planetary gear set (1) is connected with the sun gear (41) of the fourth planetary set (4),
the ring gear (43) of the fourth planetary gear set (4) is connected with the output shaft (71),
the ring gear (13) of the first planetary gear set (1) and the carrier (22) of the second planetary gear set (2) are both couplable with the housing (72) via a first brake (51),
the sun gear (11) of the first planetary gear set (1) is couplable with the housing (72) via a second brake (52),
one of:
the ring gear (43) of the fourth planetary gear set (4) is couplable with the sun gear (41) of the fourth planetary gear set (4), via a first clutch (61),
the ring gear (43) of the fourth planetary gear set (4) is couplable with the carrier (42) of the fourth planetary gear set (4) via the first clutch (61), and
the sun gear (41) of the fourth planetary gear set (4) is couplable with the carrier (42) of the fourth planetary gear set (4) via the first clutch (61),
three of first, second, third, fourth and fifth connections are designed to be permanent and two of the first, the second, the third, the fourth and the fifth connections are releasable by at least one shift element:
the first connection connects the input drive shaft (70) with the sun gear (21) of the second planetary gear set (2),
the second connection connects the input drive shaft (70) with the sun gear (31) of the third planetary gear set (3),
the third connection connects the ring gear (33) of the third planetary gear set (3) with the carrier (22) of the second planetary gear set (2),
the fourth connection connects the carrier (32) of the third planetary gear set (3) with the carrier (42) of the fourth planetary gear set (4),
the fifth connection connects of the ring gear (23) of the second planetary gear set (2) with the carrier (12) of the first planetary gear set (1) and
the input drive shaft (70) is connected with a first clutch part of a further clutch (64, 66) and a second clutch part of the further clutch is permanently connected with one of:
the carrier (32) of the third planetary gear set (3) and the carrier (42) of the fourth planetary gear set (4),
the carrier (42) of the fourth planetary gear set (4), and the ring gear (33) of the third planetary gear set (3).

2. The multi-stage transmission according to claim 1, wherein
the ring gear (23) of the second planetary gear set (2) is directly connected with the carrier (12) of the first planetary gear set (1), and
the input drive shaft (70) is couplable with the sun gear (21) of the second planetary gear set (2) via a second clutch (62).

3. The multi-stage transmission according to claim 2, wherein
the ring gear (33) of the third planetary gear set (3) is directly connected with the carrier (22) of the second planetary gear set (2),
the input drive shaft (70) is couplable with the sun gear (31) of the third planetary gear set (3) via a third clutch (63),
the carrier (32) of the third planetary gear set (3) is directly connected with the carrier (42) of the fourth planetary gear set (4), and
the input drive shaft (70) is couplable, via the further clutch (64), with the carrier (32) of the third planetary gear set (3) and the carrier (42) of the fourth planetary gear set (4).

4. The multi-stage transmission according to claim 2, wherein
the ring gear (33) of the third planetary gear set (3) is couplable with the carrier (22) of the second planetary gear set (2) via a third clutch (65),
the input drive shaft (70) is directly connected with the sun gear (31) of the third planetary gear set (3),
the carrier (32) of the third planetary gear set (3) is directly connected with the carrier (42) of the fourth planetary gear set (4), and
the input drive shaft (70) is couplable, via the further clutch (64), with the carrier (32) of the third planetary gear set (3) and the carrier (42) of the fourth planetary gear set (4).

5. The multi-stage transmission according to claim 2, wherein
the ring gear (33) of the third planetary gear set (3) is couplable with the carrier (22) of the second planetary gear set (2) via a third clutch (65),
the input drive shaft (70) is directly connected with the sun gear (31) of the third planetary gear set (3),
the carrier (32) of the third planetary gear set (3) is directly connected with the carrier (42) of the fourth planetary gear set (4), and
the input drive shaft (70) is couplable with the ring gear (33) of the third planetary gear set (3) via the further clutch (66).

6. The multi-stage transmission according to claim 2, wherein
the ring gear (33) of the third planetary gear set (3) is directly connected with the carrier (22) of the second planetary gear set (2),
the input drive shaft (70) is directly connected with the sun gear (31) of the third planetary gear set (3),
the input drive shaft (70) is couplable with the carrier (42) of the fourth planetary gear set (4) via the further clutch (64), and
the carrier (32) of the third planetary gear set (3) is couplable with the carrier (42) of the fourth planetary gear set (40) via a third clutch (67).

7. The multi-stage transmission according to claim 1, wherein
the ring gear (23) of the second planetary gear set (2) is couplable with the carrier (12) of the first planetary gear set (1) via a second clutch (68) and
the input drive shaft (70) is directly connected with the sun gear (21) of the second gear set (2).

8. The multi-stage transmission according to claim 7, wherein
the ring gear (33) of the third planetary gear set (3) is directly connected with the carrier (22) of the second planetary gear set (2),
the input drive shaft (70) is couplable with the sun gear (31) of the third planetary gear set (3) via a third clutch (63),
the carrier (32) of the third planetary gear set (3) is directly connected with the carrier (42) of the fourth planetary gear set (4), and
the input drive shaft (70) is couplable both with the carrier (32) of the third planetary gear set (3) and with the carrier (42) of the fourth planetary gear set (4), via the further clutch (64).

9. The multi-stage transmission according to claim 7, wherein
the ring gear (33) of the third planetary gear set (3) is couplable with the carrier (22) of the second planetary gear set (2) via a third clutch (65),
the input drive shaft (70) is directly connected with the sun gear (31) of the third planetary gear set (3),
the carrier (32) of the third planetary gear set (3) is directly connected with the carrier (42) of the fourth planetary gear set (4), and
the input drive shaft (70) is couplable both with the carrier (32) of the third planetary gear set (3) and with the carrier (42) of the fourth planetary gear set (4), via the further clutch (64).

10. The multi-stage transmission according to claim 7, wherein
the ring gear (33) of the third planetary gear set (3) is couplable with the carrier (22) of the second planetary gear set (2) via a third clutch (65),
the input drive shaft (70) is directly connected with the sun gear (31) of the third planetary gear set (3),
the carrier (32) of the third planetary gear set (3) is directly connected with the carrier (42) of the fourth planetary gear set (4) and
the input drive shaft (70) is couplable with the ring gear (33) of the third planetary gear set (3) via the further clutch (66).

11. The multi-stage transmission according to claim 7, wherein
the ring gear (33) of the third planetary gear set (3) is directly connected with the carrier (22) of the second planetary gear set (2),
the input drive shaft (70) is directly connected with the sun gear (31) of the third planetary gear set (3),
the carrier (32) of the third planetary gear set (3) is couplable with the carrier (42) of the fourth planetary gear set (4) via a third clutch (67), and
the input drive shaft (70) is couplable with the carrier (42) of the fourth planetary gear set (4) via the further clutch (64).

12. The multi-stage transmission according to claim 3, wherein a plurality of gears are implemented by selective engagement of the first and the second brakes and the first, the second, the third and the further clutches such that:
a first gear is implemented by engagement of the first brake (51), the first clutch (61) and the third clutch (63),
a second gear is implemented by engagement of the first brake (51), the second brake (52) and the third clutch (63),
a third gear is implemented by engagement of the first brake (51), the second clutch (62, 68) and the third clutch (63),
a fourth gear is implemented by engagement of the second brake (52), the second clutch (62, 68) and the third clutch (63),
a fifth gear is implemented by engagement of either:
the second clutch (62, 68), the third clutch (63) and the further clutch (64), or
the first brake (51), the first clutch (61) and the further clutch (64),
a sixth gear is implemented by engagement of the second brake (52), the third clutch (63) and the further clutch (64),
a seventh gear is implemented by engagement of the second brake (52), the second clutch (62, 68) and the further clutch (64),
an eighth gear is implemented by engagement of the first brake (51), the second brake (52) and the further clutch (64),
a ninth gear is implemented by engagement of the first brake (51), the second clutch (62, 68) and the further clutch (64),
a reverse gear is implemented by engagement of the first brake (51), the first clutch (61) and the second clutch (62, 68),
an additional forward gear is implemented by engagement of the second brake (52), the first clutch (61) and the second clutch (62, 68), and
another additional forward gear is implemented by engagement of the second brake (52), the first clutch (61) and the third clutch (63),
the respective elements in each of the plurality of gears not mentioned are either disengaged or unactuated.

13. The multi-stage transmission according to claim 4, wherein a plurality of gears are implemented by selective engagement of the first and the second brakes and the first, the second, the third and the further clutches such that:
a first gear is implemented by engagement of the first brake (51), the first clutch (61) and the third clutch (65),
a second gear is implemented by engagement of the first brake (51), the second brake (52) and the third clutch (65),
a third gear is implemented by engagement of the first brake (51), the second clutch (62, 68) and the third clutch (65),
a fourth gear is implemented by engagement of the second brake (52), the second clutch (62, 68) and the third clutch (65),
a fifth gear is implemented by engagement of either:
the second clutch (62, 68), the third clutch (65) and the further clutch (64), or
the first brake (51), the first clutch (61) and the further clutch (64),
a sixth gear is implemented by engagement of the second brake (52), the third clutch (65) and the further clutch (64),
a seventh gear is implemented by engagement of the second brake (52), the second clutch (62, 68) and the further clutch (64),
an eighth gear is implemented by engagement of the first brake (51), the second brake (52) and the further clutch (64),
a ninth gear is implemented by engagement of the first brake (51), the second clutch (62, 68) and the further clutch (64),
a reverse gear is implemented by engagement of the first brake (51), the first clutch (61) and the second clutch (62, 68)

an additional forward gear is implemented by engagement of the second brake (52), the first clutch (61) and the second clutch (62, 68), and another additional forward gear is implemented by engagement of the second brake (52), the first clutch (61) and the third clutch (65), the respective elements in each of the plurality of gears not mentioned are either disengaged or unactuated.

14. The multi-stage transmission according to claim 5, wherein a plurality of gears are implemented by selective engagement of the first and the second brakes and the first, the second, the third and the further clutches such that:

a first gear is implemented by engagement of the first brake (51), the first clutch (61) and the third clutch (65), a second gear is implemented by engagement of the first brake (51), the second brake (52) and the third clutch (65), a third gear is implemented by engagement of the first brake (51), the second clutch (62, 68) and the third clutch (65), a fourth gear is implemented by engagement of the second brake (52), the second clutch (62, 68) and the third clutch (65), a fifth gear is implemented by engagement of either:
 the second clutch (62, 68), the third clutch (65) and the further clutch (66), or
 the first brake (51), the first clutch (61) and the further clutch (66), a sixth gear is implemented by engagement of the second brake (52), the third clutch (65) and the further clutch (66), a seventh gear is implemented by engagement of the second brake (52), the second clutch (62, 68) and the further clutch (66), an eighth gear is implemented by engagement of the first brake (51), second brake (52) and the further clutch (66), a ninth gear is implemented by engagement of the first brake (51), the second clutch (62, 68) and the further clutch (66), a reverse gear is implemented by engagement of the first brake (51), the first clutch (61) and the second clutch (62, 68), an additional forward gear is implemented by engagement of the second brake (52), the first clutch (61) and the second clutch (62, 68), and another additional forward gear is implemented by engagement of the second brake (52), the first clutch (61) and the third clutch (65), the respective elements in each of the plurality of gears not mentioned are either disengaged or unactuated.

15. The multi-stage transmission according to claim 6, wherein a plurality of gears are implemented by selective engagement of the first and the second brakes and the first, the second, the third and the further clutches such that:

a first gear is implemented by engagement of the first brake (51), the first clutch (61) and the third clutch (67), a second gear is implemented by engagement of the first brake (51), second brake (52) and the third clutch (67), a third gear is implemented by engagement of the first brake (51), the second clutch (62, 68) and the third clutch (67), a fourth gear is implemented by engagement of the second brake (52), the second clutch (62, 68) and the third clutch (67), a fifth gear is implemented by engagement of either:
 the second clutch (62, 68), the third clutch (67) and the further clutch (64), or
 the first brake (51), the first clutch (61) and the further clutch (64), a sixth gear is implemented by engagement of the second brake (52), the third clutch (67) and the further clutch (64), a seventh gear is implemented by engagement of the second brake (52), the second clutch (62, 68) and the further clutch (64), an eighth gear is implemented by engagement of the first brake (51), the second brake (52) and the further clutch (64), a ninth gear is implemented by engagement of the first brake (51), the second clutch (62, 68) and the further clutch (64), a reverse gear is implemented by engagement of the first brake (51), the first clutch (61) and the second clutch (62, 68), an additional forward gear is implemented by engagement of the second brake (52), the first clutch (61) and the second clutch (62, 68), and another additional forward gear is implemented by engagement of the second brake (52), the first clutch (61) and the third clutch (67), the respective elements in each of the plurality of gears not mentioned are either disengaged or unactuated.

16. The multi-stage transmission according to claim 1, wherein all of the first, the second, the third and the fourth planetary gear sets (1, 2, 3, 4) are implemented as minus gear sets.

17. The multi-stage transmission according to claim 16, wherein at least one of:
 a transmission ratio between the sun gear (11) and the ring gear (13) of the first planetary gear set (1) is −2,017,
 a transmission ratio between the sun gear (21) and the ring gear (23) of the second planetary gear set (2) is −3,218,
 a transmission ratio between the sun gear (31) and the ring gear (33) of the third planetary gear set (3) is −3,900, and
 a transmission ratio between the sun gear (41) and the ring gear (43) of the fourth planetary gear set (4) is −1,600.

18. The multi-stage transmission according to claim 1, wherein the first clutch (61) and a third clutch (63, 65, 67) are implemented as claw clutches.

* * * * *